United States Patent [19]
Bennett et al.

[11] Patent Number: 5,889,968
[45] Date of Patent: Mar. 30, 1999

[54] METHOD AND APPARATUS FOR INTERLOCKING A BROADCAST MESSAGE ON A BUS

[75] Inventors: Joseph A. Bennett, Rancho Cordova; Darren Abramson, Folsom; Michael Derr, Folsom; Zohar Bogin, Folsom, all of Calif.

[73] Assignee: Intel Corporation, Santa Clara, Calif.

[21] Appl. No.: 939,801

[22] Filed: Sep. 30, 1997

[51] Int. Cl.$^6$ ..................................................... G06F 13/14
[52] U.S. Cl. ........................... 395/292; 395/726; 395/872
[58] Field of Search ................................... 395/292, 287, 395/726, 872, 875

[56] References Cited

U.S. PATENT DOCUMENTS

| | | | |
|---|---|---|---|
| 4,785,396 | 11/1988 | Murphy et al. | 395/286 |
| 5,507,002 | 4/1996 | Heil | 395/828 |
| 5,761,444 | 6/1998 | Ajanovic et al. | 395/280 |

*Primary Examiner*—Glenn A. Auve
*Attorney, Agent, or Firm*—Blakely, Sokoloff, Taylor & Zafman LLP

[57] ABSTRACT

A method and apparatus is disclosed for providing an interlocked broadcast message that solves the problem of a system component taking action in response to a broadcast message issued by a processor before the processor receives communication that the broadcast message has been delivered. A broadcast message transaction request is issued from a processor. The broadcast message transaction request is posted in a transaction request buffer. A reply is communicated to the processor that the broadcast message transaction request has been posted, and the broadcast message is then delivered over the bus. In an alternative embodiment, after the broadcast message transaction request is issued from the processor, the broadcast message transaction request is stored in a transaction request buffer. The broadcast message is only delivered over the bus once it has been determined that the reply to the processor that the broadcast message transaction has completed can be immediately delivered to the processor following the delivery of the broadcast message.

15 Claims, 6 Drawing Sheets

5,889,968

METHOD AND APPARATUS FOR INTERLOCKING A BROADCAST MESSAGE ON A BUS

BACKGROUND OF THE INVENTION

1. Field of the Invention

The present invention pertains to the field of communicating between components in a computer system. More particularly, this invention pertains to the field of communicating via broadcast messages within a computer system.

2. Background of the Related Art

Broadcast messages are issued by a processor in a computer system in order to indicate to other components in the computer system that certain instructions have been executed or certain conditions have occurred internal to the processor. Broadcast messages are not directed or addressed to any particular system component or device, but are made available to the system as a whole. Broadcast messages are sometimes referred to as "special cycles." The messages are generally delivered by the processor to a bus controller which will then forward the message to a system bus, and therefore to any system devices attached to the system bus. Some examples of broadcast messages include "shutdown" or "halt" messages that indicate to the computer system that the processor is about to stop executing instructions. Another example of a broadcast message is a "flush" message that indicates to the computer system that internal processor memory caches have been invalidated and that external caches should also be invalidated in order to assure cache coherency.

Another example of a broadcast message is a "stop_clock_grant" message that the processor delivers in response to receiving a "stop_clock#" signal from a power management device. (The symbol "#" following the name of a signal as used herein is an indication that the signal is considered to be asserted when it is in a low logic ("0") state.) The stop_clock# signal indicates to the processor that the processor is to enter a low-power state which typically precludes the processor from executing instructions and from recognizing interrupts until stop_clock# is deasserted. The stop_clock_grant broadcast message is issued by the processor in order to acknowledge that the processor received the stop_clock# signal and to alert other devices in the system that the processor is preparing to cease instruction execution.

An example of a stop_clock# and stop_clock_grant transaction is shown in FIG. 1. At time A, stop_clock# is asserted, typically by a power management device. The processor responds to the assertion of stop_clock# by issuing a stop_clock_grant broadcast message over a host bus which is generally received by a bus controller that then forwards the stop_clock_grant message on to a system bus. The stop_clock_grant message is delivered over the system bus by the bus controller at time B. The stop_clock_grant message is typically delivered over the system bus using multiple signal lines. For simplicity and clarity, the timing and logical state of the stop_clock_grant message is shown in FIG. 1 and in subsequent figures as if the message was delivered via a single signal line.

For computer systems with bus controllers and/or processors that do not support deferred reply transactions (deferred reply transactions are transactions that are scheduled to be completed after the completion of later issued transactions), a reply is communicated to the processor via a non-deferred_reply_ready# signal at time C. The assertion of the non-deferred_reply_ready# signal in general indicates to the processor that the previously issued transaction request (bus cycle) has completed. An example of a non-deferred_reply_ready# signal is the Burst Ready# (BRDY#) signal implemented on the Pentium® processor, made by Intel Corporation. Pentium® is a registered trademark of Intel Corporation.

In this particular example, the assertion of the non-deferred_reply_ready# signal indicates to the processor that the broadcast message has been delivered to the other devices in the system and that it is now permissible for the processor to cease execution of instructions. The amount of time elapsed between the delivery of the stop_clock_grant message at time B and the communication of the reply to the processor at time C is generally in the order of a several host bus clock periods.

After a period of time, it is possible that some event will occur that will stimulate the power management device to deassert stop_clock#, which would allow the processor to restart the execution of instructions. Such an event may include, but is not limited to, communications network traffic or system input device activity. In FIG. 1, the stimulus event is depicted as occurring at time D, after which stop_clock# is deasserted at time E. Once the condition that prompted the deassertion of stop_clock# no longer exists, the power management device may reassert stop_clock#, which is shown at time F.

A problem occurs for systems with bus controllers and processors that support deferred reply transactions. Because deferred reply transaction bus controllers have the ability to defer reply to the processor, it is possible that a deassertion of stop_clock# may occur before the assertion of the deferred_reply_ready# signal. The deferred_reply_ready# signal is shown in FIG. 1 just below the non-deferred_reply_ready# signal in order to highlight the potential difference in signal timing. The deferred_reply_ready# signal, like the non-deferred_reply_ready# signal, indicates to the processor in general that a previously issued transaction request has completed. In this particular example, the deferred_reply_ready# signal indicates to the processor that the broadcast message has been delivered to the other devices in the system and that it is now permissible for the processor to cease execution of instructions.

The Pentium® Pro processor made by Intel Corporation is an example of a processor that supports deferred reply transactions. In the Pentium® Pro processor, the deferred_reply_ready# signal is implemented as several Response Status signals. For purposes of clarity, although a typical implementation of a deferred_reply_ready# may include several signal lines, the deferred_reply_ready# signal is represented herein as if it is implemented as a single signal line.

In the example of FIG. 1, the deferred_reply_ready# signal is shown as being asserted at time G. The deassertion of stop_clock# before the processor receives the deferred_reply_ready# signal leaves open the possibility that the power management device may reassert stop_clock# before the processor has seen the completion of the stop_clock_grant message as indicated by the assertion of the deferred_reply_ready# signal. This situation may confuse the processor, as it may think that the deferred_reply_ready# assertion indicating that the previous stop_clock_grant message transaction has completed is due to the later assertion of stop_clock#. In other words, the processor effectively does not notice that there have been two assertions of stop_clock#. Rather, the processor thinks that there has been only one assertion of stop_clock# and that a response to that stop_clock# has been issued via the stop_clock_grant broadcast message.

In this situation, the power management device is forever waiting for confirmation that the second stop_clock# assertion has been recognized, and the processor, believing that it has already responded, is potentially forever waiting for the deassertion of stop_clock#. Since the processor will not execute instructions or recognize interrupts until a deassertion of stop_clock#, the computer system is effectively dead. Therefore, a method and apparatus for interlocking broadcast messages on a bus is desirable. The term "interlocking" as used herein is meant to include any device or method for preventing the situation where a system component takes action in response to a broadcast message issued by a processor before the processor receives communication that the broadcast message has been delivered.

SUMMARY OF THE INVENTION

A method and apparatus for interlocking a broadcast message on a bus is disclosed. A broadcast message transaction request is issued from a processor. The broadcast message transaction request is posted in a transaction request buffer. A reply is communicated to the processor that the broadcast message transaction request has been posted, and the broadcast message is then delivered over the bus.

DETAILED DESCRIPTION

A method and apparatus for interlocking a broadcast message on a bus is disclosed. In the following description, for the purposes of explanation, specific details are set forth to provide a thorough understanding of the invention. However, it will be apparent to one skilled in the art that these specific details are not required to practice the invention. In other instances, well known methods, devices, and structures are not described in particular detail in order to avoid obscuring the invention.

Overview

The invention solves the problem of a system component taking action in response to a broadcast message issued by a processor before the processor receives communication that the broadcast message has been delivered. In general, and in accordance with one embodiment of the invention, a processor issues a broadcast message transaction request over a host bus. A bus controller responds to the broadcast message transaction request by posting the broadcast message transaction request in a transaction request buffer within the bus controller. Once the bus controller has posted the broadcast message transaction request, it responds to the processor that the broadcast message transaction request has been completed. The bus controller then delivers the broadcast message over a system bus. Thus, the processor receives notice of the completion of the broadcast message transaction request before any system device has the opportunity to take any action based on the broadcast message.

Embodiments of the Invention

Figure 1:
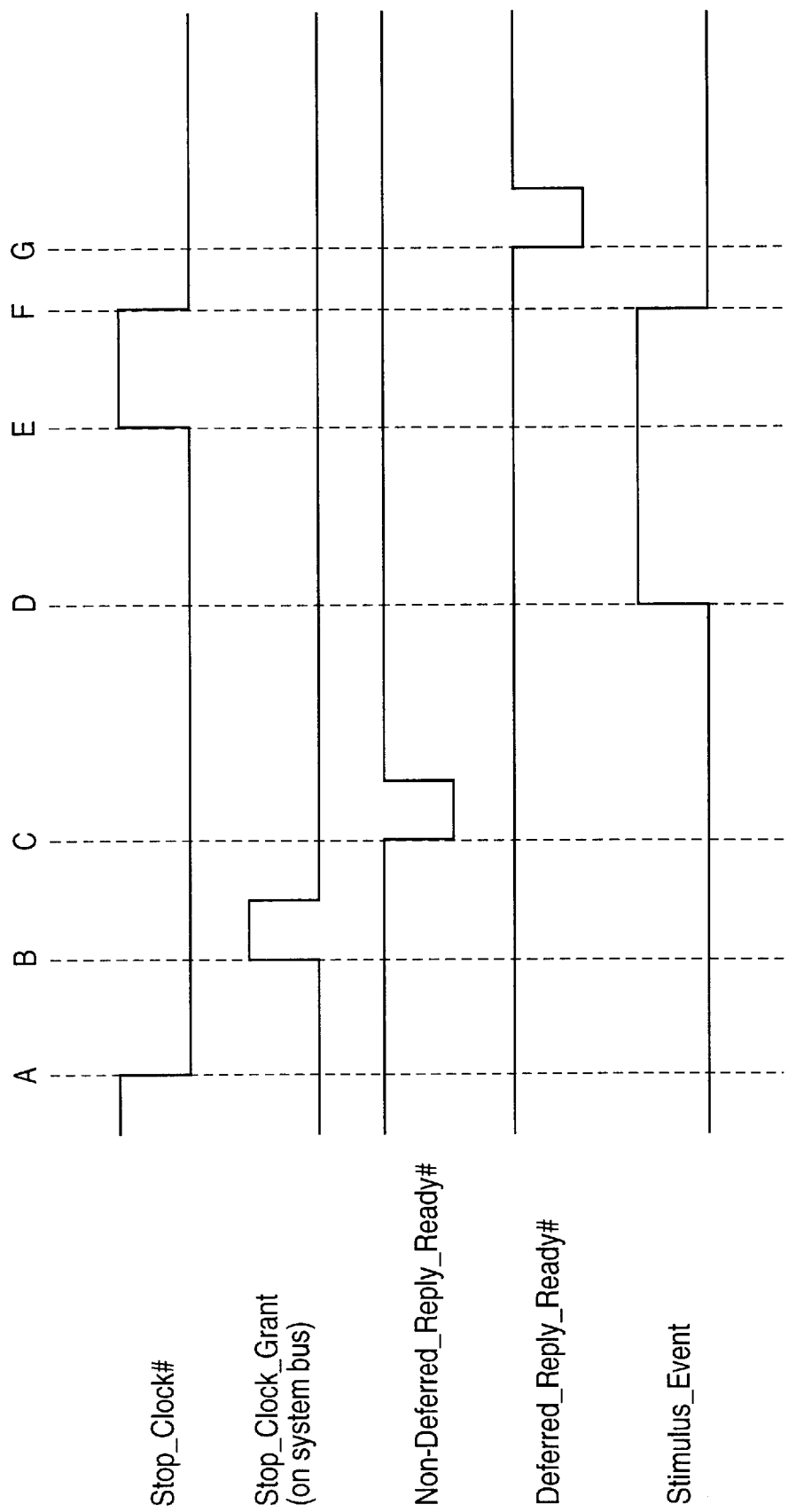
FIG. 1 shows a timing diagram of a stop_clock_grant transaction implemented in accordance with the prior art.
Figure 2:
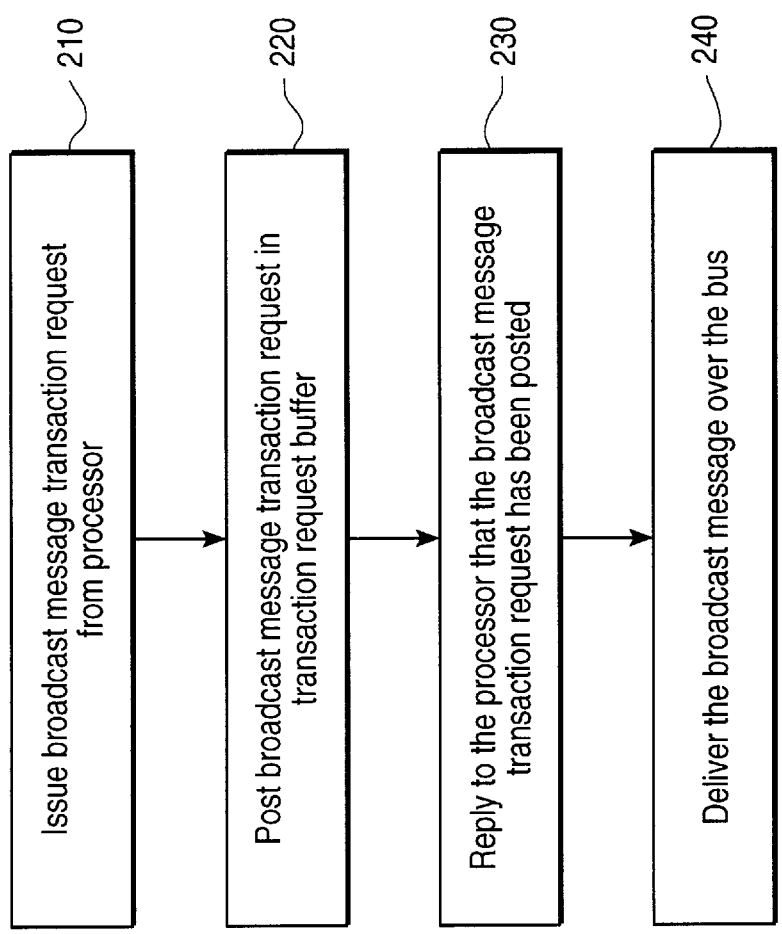
FIG. 2 depicts a flow diagram of a method for interlocking broadcast messages on a bus implemented in accordance with one embodiment of the invention.

FIG. 2 depicts a flow diagram of a method for interlocking a broadcast message on a bus implemented in accordance with one embodiment of the invention. At step 210, a broadcast message transaction request is issued from a processor. The broadcast message transaction request is posted in a transaction request buffer at step 220. The transaction request buffer may be included in a bus controller that serves as a bridge between a host bus on which the processor is situated and a system bus. Once the broadcast message transaction request is posted, at step 230 the bus controller replies to the processor that the broadcast message transaction request has been posted. This reply may be made via the bus controller's normal signal(s) for signaling the completion of a transaction. For example, the reply may be made via a deferred_reply_ready# signal as discussed above in connection with FIG. 1. The invention may be practiced with any method of informing the processor that the transaction has completed. Once the reply is made to the processor that the transaction has completed, the broadcast message is delivered over the system bus by the bus controller.

Figure 3:
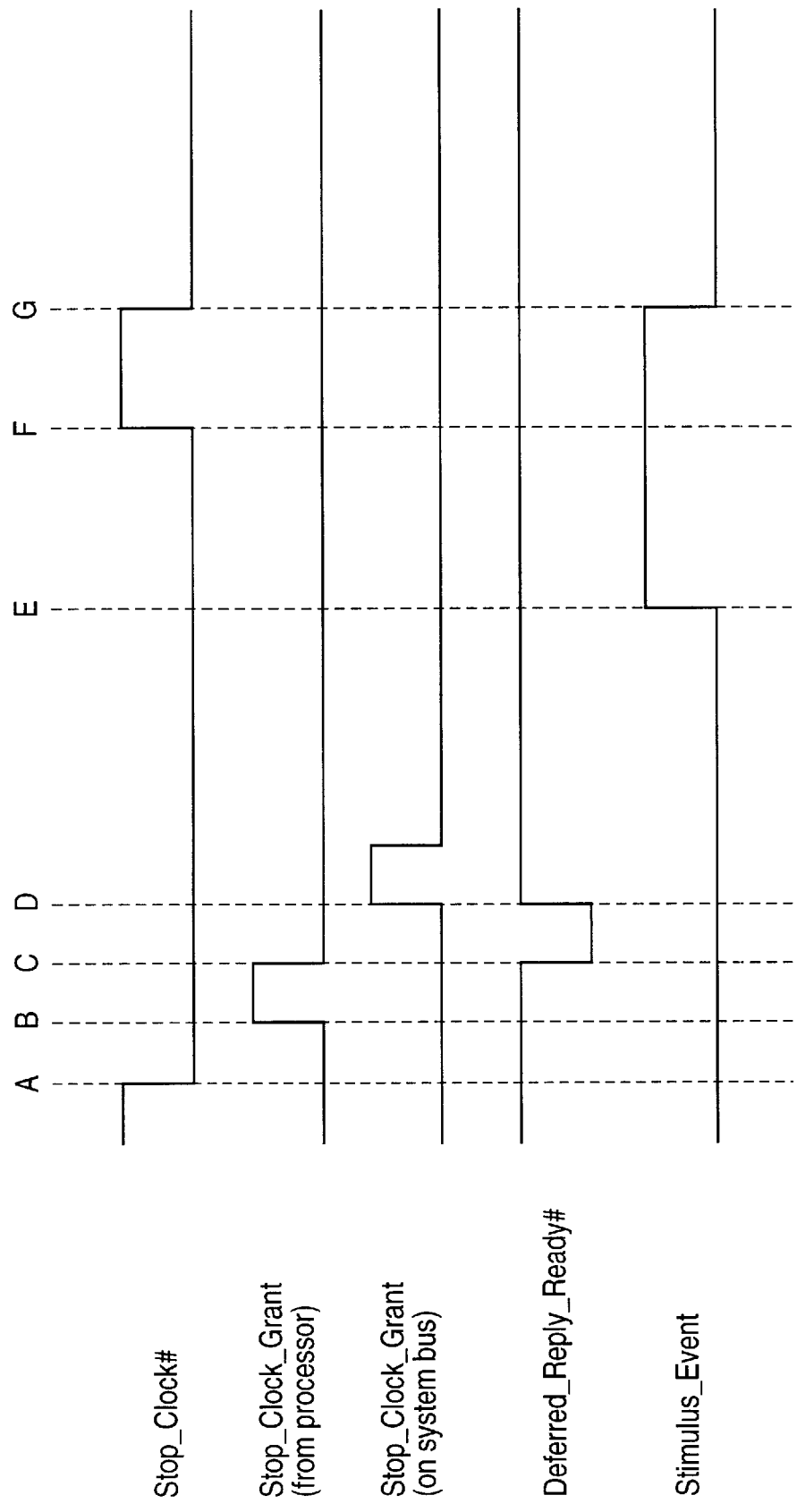
FIG. 3 shows a timing diagram of a stop_clock_grant transaction implemented in accordance with the embodiment of the invention of FIG. 2.

FIG. 3 shows a timing diagram of an example stop_clock_grant transaction using the method described above in connection with FIG. 2. The stop_clock# signal is asserted by a power management device at time A. Some time later, the processor responds to the assertion of stop_clock# by issuing a stop_clock_grant broadcast message transaction request on a host bus at time B. A bus controller responds to the stop_clock_grant message by posting the stop_clock_grant transaction request in a transaction request buffer, then replies at time C to the processor via the deferred_reply_ready# message that the stop_clock grant transaction has completed. Once the bus controller has replied to the processor that the stop_clock_grant cycle has completed, the bus controller delivers the stop_clock_grant broadcast message over the system bus at time D. The time elapsed between points C and D can vary widely depending on the amount of concurrent bus controller activity. As long as the stop_clock_grant is delivered over the system bus after the processor receives the deferred_reply_ready# signal from the bus controller, no system device, in this example the power management device, will be able to take action based on the stop_clock_grant message before the processor receives confirmation that the stop_clock_grant broadcast message transaction has completed, and therefore the power management device and the processor remain in synch, and the deadlock condition described above in connection with FIG. 1 cannot occur.

As an illustration of this, notice in FIG. 3 that when the power management device deasserts stop_clock# at time F in response to the stimulus event occurring at time E, the processor has already received a reply at time C to the stop_clock_grant message issued at time B in response to first assertion of stop_clock# at time A. Therefore, the processor will recognize the second assertion of stop_clock# at time G as a new assertion of stop_clock#, and the processor will at some future point in time issue a new stop_clock_grant broadcast message.

An additional benefit of the embodiment disclosed above in connection with FIGS. 2 and 3 is that the processor will spend more time in the low-power state than would otherwise be possible. Since the processor will enter the low-power state as soon as the deferred_reply_ready# signal is received, the processor enters the low-power state earlier than would be the case if the deferred_reply_ready# signal is received sometime after the delivery of the stop_clock_grant message on the system bus.

Figure 4:
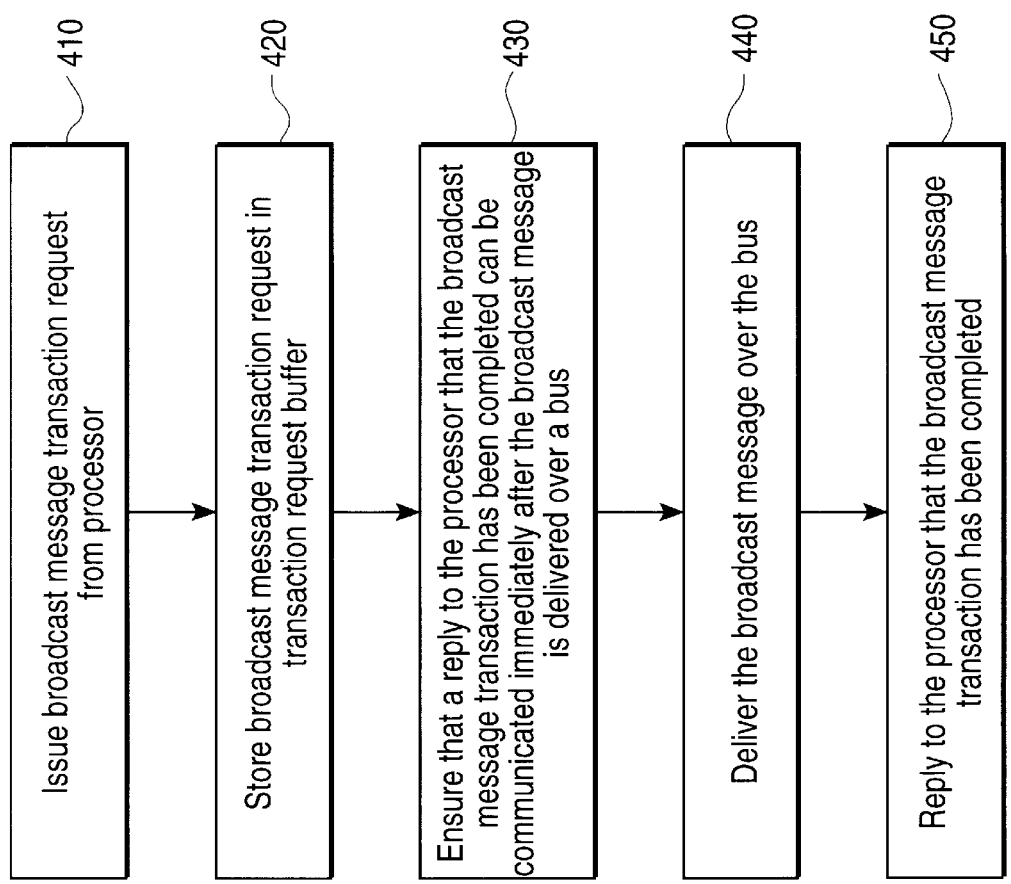
FIG. 4 depicts a flow diagram of a method for interlocking broadcast messages on a bus implemented in accordance with another embodiment of the invention.

FIG. 4 depicts a flow diagram of a method for interlocking a broadcast message on a bus implemented in accordance with an additional embodiment of the invention. At step 410, a broadcast message transaction request is issued from a processor. The broadcast message transaction request is stored in a transaction request buffer at step 420. The transaction request buffer may be located in a bus controller.

At step 430, the bus controller ensures that a reply can be made to the processor immediately after the delivery of the message on a system bus. The bus controller may need to empty transaction request and reply buffers by completing deferred transactions and issuing replies to the deferred transactions in order to ensure that the reply to the broadcast message transaction will not have to sit in a transaction reply buffer behind other transaction replies. The bus controller may also serve as a pathway to a graphics bus or to system memory. Any transactions being serviced by the bus controller to the graphics bus or to system memory may also need to be completed in order to ensure that the bus controller can immediately reply to the processor that the broadcast message transaction has completed.

Once the bus controller has ensured that a reply can be made to the processor immediately after the delivery of the broadcast message on the system bus, the message is delivered over the system bus at step 440. The bus controller then immediately replies to the processor at step 450 that the broadcast message transaction has been completed.

Figure 5:
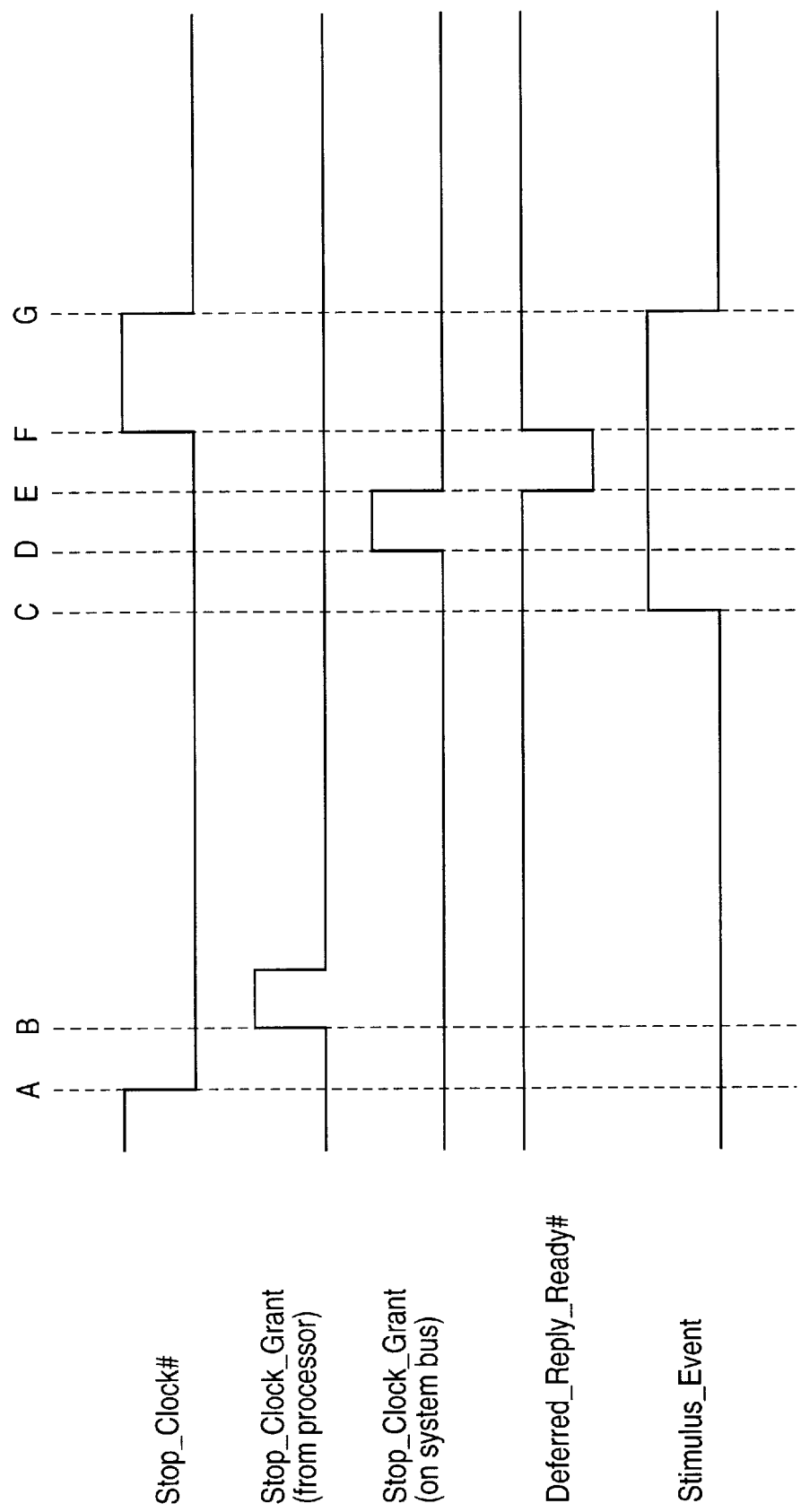
FIG. 5 shows a timing diagram of a stop_clock_grant transaction implemented in accordance with the embodiment of the invention of FIG. 4.

FIG. 5 shows an example timing diagram of a stop_clock_grant transaction implemented in accordance with the method described above in connection with FIG. 4. The stop_clock# signal is asserted by a power management device at time A. Some time later, the processor responds to the assertion of stop_clock# by issuing a stop_clock_grant broadcast message transaction request on a host bus at time B. A bus controller responds to the stop_clock_grant message by storing the stop_clock_grant transaction request in a transaction request buffer. Once the stop_clock_grant transaction request is stored, the bus controller must ensure that once the stop_clock_grant message is delivered over the system bus at time D, a reply can be immediately made to the processor at time E.

The power management device must not deassert stop_clock# at time F in response to the stimulus event occurring at time C until the broadcast message is delivered over the system bus at point D. The period of time between the delivery of the message at time D and the reply to the processor at time E is on the order of several host bus clock periods. As long as the deferred_reply_ready# signal is asserted within several host clock periods after the stop_clock_grant is delivered over the system bus the power management device will not be able to take action based on the stop_clock_grant message before the processor receives confirmation that the stop_clock_grant broadcast message transaction has completed, and therefore the power management device and the processor remain in synch, and the deadlock condition described above in connection with FIG. 1 cannot occur.

For example, notice in FIG. 5 that when the power management device deasserts stop_clock# at time F in response to the stimulus event occurring at time C, the processor has already received a reply at time E to the stop_clock_grant message issued at time D in response to first assertion of stop_clock# at time A. Therefore, the processor will recognize the second assertion of stop_clock# at time G as a new assertion of stop_clock#, and the processor will at some future point in time issue a new stop_clock_grant broadcast message.

Figure 6:
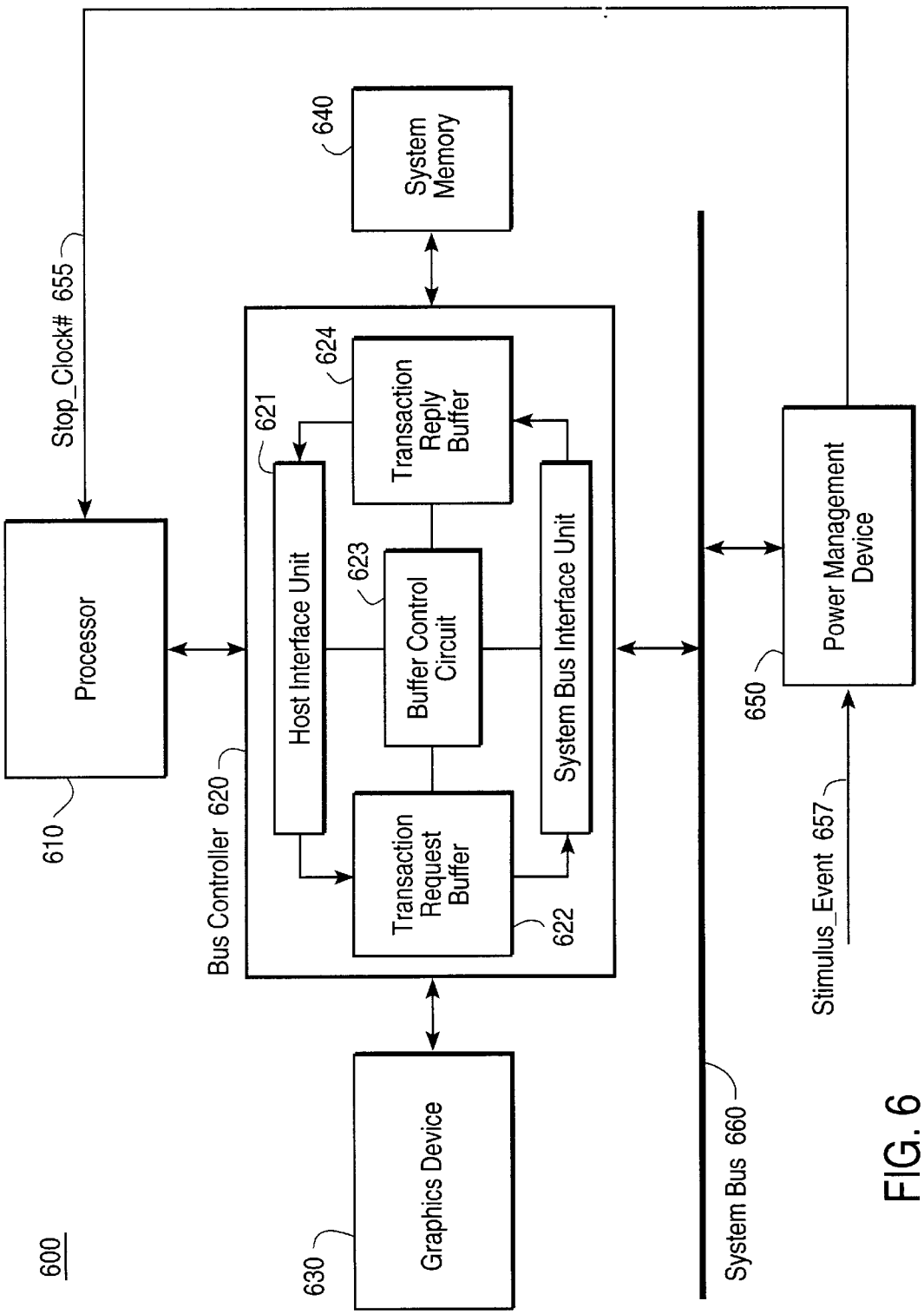
FIG. 6 illustrates an example computer system including a bus controller implemented in accordance with one embodiment of the invention.

FIG. 6 illustrates an example computer system including a bus controller implemented in accordance with one embodiment of the invention. The computer system 600 includes a processor 610, a bus controller 620, a graphics device 630, a system memory device 640, a system bus 660, and a power management device 650. The processor may be a Pentium Pro processor or a Pentium® II processor made by Intel corporation, among others, including processors that are compatible with the above. The graphics device and the system memory are intended to represent a broad range of wellknown devices.

The bus controller includes a host interface unit 621, a transaction request buffer 622, a buffer control circuit 623, a transaction reply buffer 624, and a system bus interface unit 625. The bus controller is coupled to the processor 610, the graphics device 630, the system memory 640, and a system bus 660. Also coupled to the system bus is a power management device 650. The processor 610 and the bus controller 620 each support deferred reply transactions.

The power management device 650 seeks to conserve power consumption by causing the processor to selectively enter a low-power state. The decision to cause the processor to enter the low-power state may be based on several factors such as system activity levels, temperature levels within a system chassis, etc. When the power management device desires to place the processor in a low-power state, the power management device asserts a stop_clock# signal 655. The power management device 650 may deassert stop_clock# in response to an occurrence of some event, including but not limited to, network traffic or system input device activity such as a keystroke. The occurrence of the event is represented by the stimulus_event signal 657.

The processor 610 responds to the assertion of the stop_clock# signal 655 by issuing a stop_clock_grant broadcast message transaction request to the bus controller 620 which communicates with the processor 610 via the host interface unit 621. In one embodiment of the invention, the bus controller responds to the stop_clock_grant message transaction request by posting the request in the transaction request buffer 622. The host interface unit 621 then replies to the processor that the stop_clock_grant message transaction request has been completed. Following the reply to the processor 610, the system bus interface unit 625 forwards the stop_clock_grant broadcast message to the system bus 660, and therefore to the power management device 650.

In an alternative embodiment, the bus controller responds to the stop_clock_grant broadcast message transaction request by first storing the transaction request in the transaction request buffer. The buffer control circuit 623 then must ensure that a reply can be made to the processor 610 immediately after the delivery of the stop_clock_grant message on the system bus 660. The buffer control circuit 623 may accomplish this by emptying the transaction request buffer 622 and the transaction reply buffer 624, leaving only the stop_clock_grant broadcast message transaction request in the transaction request buffer 622. This ensures that the reply to the stop_clock_grant transaction will have a clear path to the processor 610 and will not need to wait for other replies to be made to the processor 610. Once the buffer control circuit 623 ensures that a reply can be made to the processor 610 immediately after the delivery of the stop_clock_grant message on the system bus 660, the system bus interface unit 625 delivers the stop_clock_grant broadcast message on the system bus 660. As soon as the stop_clock_grant message is delivered, the host interface unit 625 replies to the processor 610 that the stop_clock_grant broadcast message transaction request has been completed. The power management device 650 must not deassert and reassert the stop_clock# signal 655 until the stop_clock_grant message is delivered over the system bus 660.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded in an illustrative rather than in a restrictive sense.

Further, although much of the above discussion is made in connection with a stop_clock_grant broadcast message, the invention may be practiced with any broadcast message in a computer system. Additionally, the timing diagrams shown in FIGS. 3 and 5 are not intended to portray exact timing relationships. Rather, the timing diagrams are to be regarded as examples and are included in order to more clearly teach the invention.

What is claimed is:

1. A method for interlocking a broadcast message on a bus, the method comprising the steps of:

issuing a broadcast message transaction request from a processor;

posting the broadcast message transaction request in a transaction request buffer;

replying to the processor that the broadcast message transaction request has been posted; and delivering the broadcast message over the bus.

2. The method of claim 1, wherein the step of issuing a broadcast message transaction request includes the step of issuing a stop clock grant transaction request.

3. A method for interlocking a broadcast message on a bus, the method comprising the steps of:

issuing a broadcast message transaction request from a processor; storing the broadcast message transaction request in a transaction request buffer;

ensuring that a reply to the processor is capable of being immediately communicated upon delivering the broadcast message over the bus, the reply communicating that the broadcast message transaction has completed;

delivering the broadcast message over the bus; and replying to the processor that the broadcast message transaction request has been completed.

4. The method of claim 3, wherein the step of issuing a broadcast message transaction request includes the step of issuing a stop clock grant transaction request.

5. The method of claim 3, wherein the step of ensuring that a reply to the processor is capable of being immediately communicated upon delivering the broadcast message over the bus includes the steps of:

emptying all transaction requests stored in the transaction request buffer other than the broadcast message transaction request; and emptying a transaction reply buffer.

6. A bus controller, comprising:

a host interface unit for receiving and replying to a broadcast message transaction request issued from a processor, the broadcast message transaction request for communicating a broadcast message;

a transaction request buffer coupled to host interface unit for posting the broadcast message transaction request, the host interface unit replying to the processor that the broadcast message transaction request has been posted; and a bus interface unit coupled to the buffer that communicates the broadcast message over a bus.

7. The bus controller of claim 6 wherein the broadcast message includes a stop clock grant message.

8. A bus controller, comprising:

a host interface unit for receiving and replying to transaction requests issued from a processor, the transaction requests including a broadcast message transaction request for communicating a broadcast message;

a transaction request buffer coupled to the host interface unit for storing the transaction requests;

a transaction reply buffer coupled to the host interface unit for storing transaction replies including a reply to the broadcast message transaction request, the reply to the broadcast message transaction request indicating to the processor that the broadcast message has been communicated over a bus;

a buffer control circuit coupled to the transaction request buffer and the transaction reply buffer that ensures that the reply to the broadcast message transaction request is delivered to the processor immediately after the broadcast message is communicated over the bus; and a bus interface unit coupled to the transaction reply buffer and the transaction request buffer for communicating the broadcast message over the bus.

9. The bus controller of claim 8 wherein the broadcast message includes a stop clock grant message.

10. A computer system, comprising:

a processor coupled to a host bus; and a bus controller that includes a host interface unit coupled to the host bus for receiving and replying to a broadcast message transaction request issued from the processor, the broadcast message transaction request for communicating a broadcast message;

a transaction request buffer coupled to the host interface unit for posting the broadcast message transaction request, the host interface unit replying to the processor that the broadcast message transaction request has been posted; and a bus interface unit coupled to the transaction request buffer and further coupled to a system bus, the bus interface unit communicating the broadcast message over the system bus.

11. The computer system of claim 10 wherein the broadcast message includes a stop clock grant message.

12. A bus controller, comprising:

means for receiving and replying to a broadcast message transaction request issued from a processor, the broadcast message transaction request for communicating a broadcast message;

means for posting the broadcast message transaction request coupled to the means for receiving and replying to a broadcast message transaction request, the means for receiving and replying to the broadcast message transaction request replying to the processor that the broadcast message transaction request has been posted; and means for communicating the broadcast message over a bus, the means for communicating the broadcast message coupled to the means for posting the broadcast message transaction request.

13. The bus controller of claim 12 wherein the broadcast message includes a stop clock grant message.

14. A bus controller, comprising:

means for receiving and replying to transaction requests issued from a processor, the transaction requests including a broadcast message transaction request for communicating a broadcast message;

means for storing the transaction requests coupled to the means for receiving and replying;

means for storing transaction replies coupled to the means for receiving and replying, the transaction replies including a reply to the broadcast message transaction request, the reply to the broadcast message transaction request indicating to the processor that the broadcast message has been communicated over a bus;

means for ensuring that the reply to the broadcast message transaction request is delivered to the processor immediately after the broadcast message is communicated over the bus, the means for ensuring coupled to the means for storing transaction requests and further coupled to the means for storing transaction replies; and means for communicating the broadcast message over the bus, the means for communicating coupled to the means for storing the transaction request and further coupled to the means for storing the transaction replies.

15. The bus controller of claim 14 wherein the broadcast message includes a stop clock grant message.

* * * * *